March 1, 1955     M. L. SMALLEGAN     2,703,098
POULTRY WATERER
Filed May 25, 1953
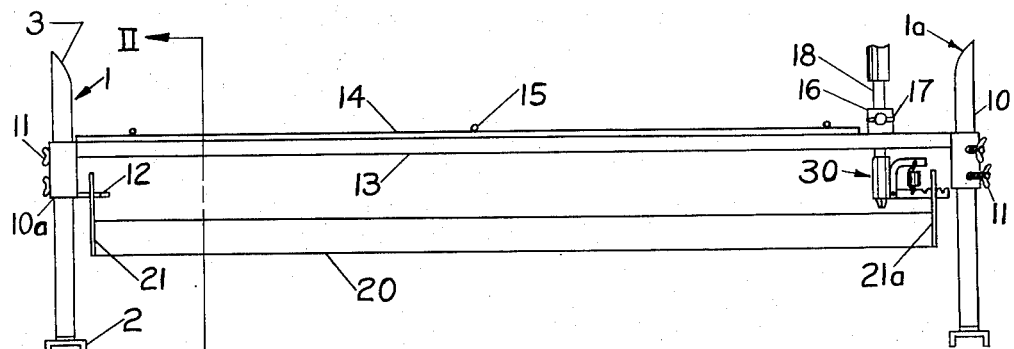
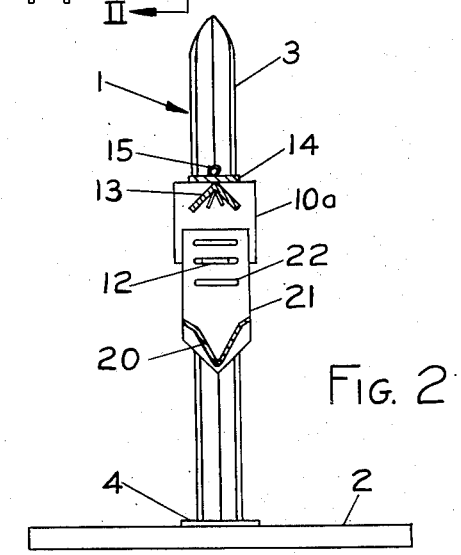
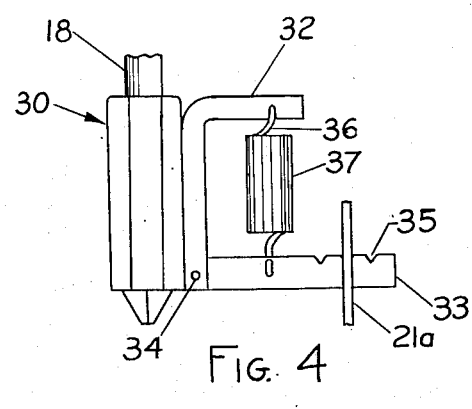
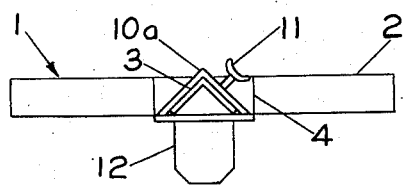
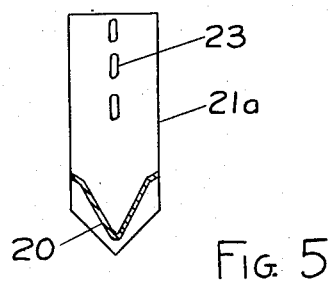
INVENTOR.
MARVIN L. SMALLEGAN
BY
ATTORNEY United States Patent Office 2,703,098
Patented Mar. 1, 1955

2,703,098
POULTRY WATERER

Marvin L. Smallegan, Zeeland, Mich., assignor to Automatic Poultry Feeder Company, Zeeland, Mich., a corporation of Michigan Application May 25, 1953, Serial No. 357,019

2 Claims. (Cl. 137—408)

This invention relates to poultry waterers and more particularly to the construction of a single trough, self-filling waterer particularly designed for rapid adjustment and quick assembly and disassembly.

Existing poultry waterers are complex structures involving numerous individual parts often necessitating several hours to assemble. Further, these structures require as much as an hour to disassemble and reassemble simply for periodic cleaning.

These structures, despite their complexity, frequently fail as a result of structural weaknesses. These waterers are subject to rough usage both from the poultry and from the operators.

It is the object of my invention to overcome these difficulties by providing a waterer of extremely simple and compact design capable of withstanding rough usage and handling. It is a further object of my invention to provide a waterer which can be initially assembled in a matter of minutes and can either be moved as a completely assembled unit or as a disassembled unit with the steps of assembly and disassembly for moving purposes requiring but a few minutes.

It is an additional object of my invention to provide a waterer of simple construction which will facilitiate its maintenance in clean and sanitary conditon. This is accomplished both by reducing the number of parts involved and by making the disassembly for cleaning purposes a simple and rapid operation.

These and other objects and purposes of my invention will be immediately seen by those acquainted with the design and construction of poultry equipment upon reading the following specification and accompanying drawings.

In the drawings:

Fig. 1 is a side elevation view of my poultry waterer.

Fig. 2 is an enlarged sectional elevation view taken along the plane II—II of Fig. 1.

Fig. 3 is a plan view of one of the standards for my poultry waterer.

Fig. 4 is an enlarged, oblique view of the valve for my poultry waterer.

Fig. 5 is a fragmentary view of a portion of the water receptacle.

In carrying out the objects and purposes of my invention, I have provided a pair of standards having the general shape of an inverted T. These standards are detachably joined by a tie rod slidably mounted on each standard whereby the vertical position of the tie rod may be adjusted. The means securing the tie rods to each of the standards closely surrounds the standard, providing positive engagement to prevent rocking of the unit. A trough is suspended below the tie rod. One end of the trough is suspended upon a lever of a valve whereby the weight of the trough and its contents regulates the introduction of water to the trough.

Referring to the drawings in greater detail, the numerals 1 and 1a refer to a pair of standards, one being located at each end of the trough assembly. The standards 1 and 1a are identical in their construction. These standards consist of a channel section forming a base 2 extending laterally of the trough. A vertical member 3 extends upwardly from the base and has a plate 4 secured at its lower end. The plate 4 in turn is secured to the base 2. The plate 4 is secured to the vertical member 3 by welding and, in turn, is secured ot the base 2 either by welding or by screws or bolts, depending upon whether it is desired to make the vertical member and the base detachable. The vertical member 3 consists of a length of angle iron arranged with its apex extending outwardly from the trough assembly.

Each of the legs 1 and 1a is surrounded by a triangular slide 10. The slides 10 and 10a each have a triangular, central aperture through which passes the vertical member 3 of one of the standards 1 and 1a. This aperture is of such size and shape that the slides 10 and 10a seat closely about the vertical members 3. The slides 10 and 10a are each secured to the vertical members by a pair of set screws 11 equipped with a winged head whereby they may be easily tightened without the use of tools. The slides 10 and 10a are identical except that the slide 10a has, at its lower end, a horizontal flange 12 extending inwardly toward the other of the standards. The purpose of the flange 12 will appear more fully hereinafter.

Extending between the slides 10 and 10a and rigidly secured to each of them is a tie bar 13. The tie bar 13 is formed of the same angle iron as the vertical members 3 of the standards 1 and 1a. It is arranged with its apex positioned upwardly and mid-way between its sides. Loosely mounted on the top of the tie bar 13 is an anti-roosting strip 14. The anti-roosting strip is attached to the tie bar 13 by means of cotter pins 15. By this means, the anti-roosting strip, while secured to the tie bar, is so loosely held that it readily flips from one side to the other and prevents poultry from finding a secure perch thereon. Adjacent one end of the tie bar 13, a clip 16 is mounted to the top of the tie bar. The clip is equipped with a wing nut headed set screw 17 for securing the water inlet pipe 18 extending down through the clip and tie bar.

Beneath the tie bar 13 is the water holding trough 20 consisting of a V-shaped member, closed on each end by a plate 21. The plates 21 and 21a are identical except for the slotting provided in their upper ends. Each of the plates 21 and 21a not only serves as a terminal for closing the ends of the trough 20 but also extends substantially above the trough to provide a supporting hanger for the trough. The plate 21 is provided with a pair of horizontal slots 22 of such size that they may readily receive the flange 12. The plate 21a is provided with vertically arranged slots 23 for engaging the hereinafter described valve 30.

The valve 30 is mounted at the lower end of the water inlet pipe 18 and regulates the discharge of water from the pipe. The valve 30 consists of a valve housing to which is rigidly secured an arm 32. One leg of the arm projects outwardly from the top of the housing and the other leg of the arm lays against and parallels the housing. At the lower end of that portion of the arm paralleling the valve housing 31, a lever 33 is pivotally secured at 34. The end of the lever 33, within the valve housing 31, by its vertical movements, opens and closes the valve. The other end of the lever 33 projects from the valve housing 31 beneath and in alignment with the arm 32 and is equipped with notches 35. The end of the lever 33 passes through one of the openings 23 and by means of the notches, securely engages the end plate 21a. The lever 33 is urged upwardly into valve closing position by means of a spring 36 enclosed in a protective shell 37. Detailed description of the internal structure of the valve 30 is not given because it may be of any suitable design, a number of which are currently commercially available. It forms no part of this invention.

Each of the various components of my watering trough, with the exception of the valve, may be fabricated from steel or aluminum. If it is fabricated from steel, the various parts are coated with a corrosion resistant material. Preferably the trough 20 is enamelled to give it not only corrosion resistance but a slick surface whereby it may be easily cleaned of any debris or algae and other scummy materials which might collect in the water. The various parts of the valve are preferably fabricated from brass or other suitable material.

Operation

To assemble my poultry waterer, the standards are placed in position and the tie rod 13 with the slides 10 and 10a assembled thereto, is secured to each of the standards. If the surface on which the water is placed is uneven, this may be readily compensated since the slides 10 and 10a may be secured to the standards at different heights from the base 4. When the tie rod 13 has been secured to the standards, the standards and the tie rod form a rigid assembly which will not rack in any direction due to the secure fit between the slides and the standards. The valve assembly 30 is then mounted on the tie rod 13 by passing the pipe 18 up through the tie rod and the bracket 16. The valve assembly 30 is secured in the desired position by tightening the set screw 17.

The upper end of the pipe 18 is secured to any suitable source of water such as a hose. The trough is assembled to the rest of the structure by passing the end plate 21a over the lever 33 and the end plate 21 over the flange 12. Depending upon the vertical movement desired, the end plate 21a is seated in one of the notches 35. Since the end plate 21 and the flange 12 have a sliding engagement, no difficulty is encountered in moving the trough longitudinally of the assembly to seat it in the desired notch 35.

When the trough is empty, the spring 36 lifts the lever 33 and the trough upwardly at the same time opening the valve 30. The spring 36 is of sufficient strength to hold the trough up until the trough is almost full. When the weight of the water in the trough overcomes the strength of the spring 36 the lever 33 is pulled down and the valve 18 closed. The depth of water in the trough necessary to close the valve will depend upon the notch 35 selected. The closer the notch to the valve the greater the water depth.

As the poultry withdraw water from the trough, the trough will be gradually lightened until once again it will be too light to overcome the spring 36 and the valve 30 will be opened. Thus, the valve automatically maintains sufficient water in the trough at all times.

When it is desired to clean the trough, the trough may be quickly removed from the assembly by simply lifting it and moving it longitudinally of the assembly to disengage the lever 33 and the flange 12. Thus removed, the trough may be easily washed and wiped clean and returned to the assembly with a minimum of effort and time.

Since my poultry waterer is designed with a minimum of parts and involves only the simplest of operations to effect its assembly and disassembly, it may be erected and removed in a minimum of time and with a minimum of skill. It is substantially impossible to assemble it incorrectly even though the assembly is delegated to unskilled mechanics. The structure being rigidly held together, will not rack. Therefore the various joints and parts of the assembly will not become detached and the whole will withstand rough usage.

The anti-roosting bar 14, by its loose assembly to the tie bar 13, prevents the poultry from roosting above the trough 20. This keeps the water clean and sanitary.

It will be recognized that minor modifications of my invention may be made, each without departing from the principle thereof. Each of these modifications is to be considered as included in the hereinafter appended claims, unless these claims by their language expressly state otherwise.

I claim:

1. In a poultry waterer having a trough and a water inlet valve suspended above said trough, the combination comprising: a hanger on each end of said trough, each of said hangers having an upper portion projecting above said trough; the upper portion of each of said hangers having a plurality of openings spaced apart vertically; means for supporting the end of said trough remote from said inlet valve, said means having a horizontally extending finger adapted to pass through said openings in one of said hangers; a pivotally mounted operating lever projecting substantially horizontally from said inlet valve; said lever adapted to pass through said openings in the other said hangers.

2. In a poultry waterer having a trough and a water inlet valve suspended above said trough, the combination comprising: a hanger on each end of said trough, each of said hangers having an upper portion projecting above said trough; the upper portion of each of said hangers having a plurality of openings spaced apart vertically; means for supporting the end of said trough remote from said inlet valve, said means having a horizontally extending finger adapted to pass through said openings in one of said hangers; a pivotally mounted operating lever projecting substantially horizontally from said inlet valve; said lever adapted to pass through said openings in the other said hangers; said finger and said lever each being of substantial length whereby said trough may be moved longitudinally thereof for adjusting the spacing of said other hanger from the pivotal mounting of said lever.

References Cited in the file of this patent

UNITED STATES PATENTS

| | | |
|---|---|---|
| 1,384,699 | Krull | July 12, 1921 |
| 1,415,178 | Imschweiler | May 9, 1922 |
| 1,835,939 | Fisher | Dec. 8, 1931 |
| 2,397,479 | Francis | Apr. 2, 1946 |
| 2,477,138 | Olson | July 26, 1949 |

OTHER REFERENCES

Pacific Rural Press, November 1, 1941, page 289.